United States Patent [19]

Saunders

[11] 4,012,562
[45] * Mar. 15, 1977

[54] MODULAR ELECTRICAL ENERGY STORAGE DEVICE

[75] Inventor: Richard C. Saunders, Simi, Calif.

[73] Assignee: Electric Power Research Institute, Inc., Palo Alto, Calif.

[ * ] Notice: The portion of the term of this patent subsequent to Dec. 14, 1993, has been disclaimed.

[22] Filed: Nov. 28, 1975

[21] Appl. No.: 635,825

Related U.S. Application Data

[63] Continuation-in-part of Ser. No. 512,818, Oct. 7, 1974.

[52] U.S. Cl. .............................................. 429/103
[51] Int. Cl.² .......................................... H01M 4/36
[58] Field of Search ............... 136/6 LF, 6 R, 6 FS, 136/6 F, 22, 121, 20, 166

[56] References Cited
UNITED STATES PATENTS

| | | | |
|---|---|---|---|
| 3,551,205 | 12/1970 | Fraioli et al. | 136/22 |
| 3,645,792 | 2/1972 | Hacha | 136/6 LF X |
| 3,770,502 | 11/1973 | Nakabayshi | 136/6 FS |
| 3,829,327 | 8/1974 | Omori et al. | 136/121 X |

Primary Examiner—C. F. LeFevour
Attorney, Agent, or Firm—L. Lee Humphries; Henry Kolin; Clark E. DeLarvin

[57] ABSTRACT

A compact modular electrical energy storage device comprising one or more cell modules in which certain components of the device are maintained in a substantially fixed position in the device by utilizing a resilient porous body of compressed carbon fibers to resiliently urge the components into physical contact with one another. The invention further provides means for maintaining the cell components in such fixed position during cell operation at elevated temperatures for extended periods of time.

A preferred compact cell module construction particularly suitable for use in a high-temperature, high-energy-density lithium battery includes two positive electrode assemblies positoned in opposing relationship by a U-shaped spacer member maintained in contact with a separator member of each positive electrode assembly by a resilient porous body of compressed graphite fibers, a unitary double-faced negative electrode assembly being positioned between the two positive electrode assemblies.

7 Claims, 7 Drawing Figures

MODULAR ELECTRICAL ENERGY STORAGE DEVICE

CROSS REFERENCE TO RELATED APPLICATION

This application is a continuation-in-part of application Ser. No. 512,818 filed Oct. 7, 1974.

BACKGROUND OF THE INVENTION

1. Field of the Invention

The present invention relates to a rechargeable electrical energy storage device, and, more particularly, to a compact modular rechargeable cell construction which utilizes a molten salt electrolyte.

2. Prior Art

The problem of air pollution in urban areas attributed to emissions from motor vehicles using internal combustion engines is of increasing concern. Because battery-powered vehicles themselves produce no exhaust or unburned fuel emission, they are particularly attractive for urban use. However, to develop practical automobiles for general use, low-cost secondary batteries having sufficient high-energy density and high-power density are required. Liquid lithium metal has been extensively utilized in some high-power density molten salt batteries, e.g., $Li/Cl_2$, $Li/S$, $Li/Se$, and $Li/Te$.

The lithium-sulfur cell using molten halide electrolytes is of particular interest. See M. L. Kyle et al, "Lithium/Sulfur Batteries for Electric Vehicle Propulsion", 1971 *Sixth Intersociety Energy Conversion Engineering Conference Proceedings*, p 38; L. A. Heredy et al, *Proc. Intern. Electric Vehicle Symp.*, Electric Vehicle Council 1, 375 (1969). However, it has been found that high self-discharge rates due to corrosion of cell components by liquid lithium coupled with some appreciable solubility of liquid lithium in the molten salt electrolytes often cause difficulties in material selection and battery cell design. Such difficulties can be avoided by use of a solid alloy of lithium as a source of lithium in an electrochemical cell. One such alloy is the aluminum-lithium alloy which has been utilized as the solid negative electrode. Excellent electrochemical performance of aluminum-lithium alloy in a composition range of 5–30 wt.% lithium in a molten salt electrolyte has been reported. See N. P. Yao et al, "Emf Measurements of Electrochemically Prepared Lithium-Aluminum Alloy", *J. Electrochem. Soc.* 118, 1039–1042 (July 1971) and references cited therein.

Heretofore, the principal reported effort toward the development of a high-energy-density battery has been directed toward improvement of the individual active components of the cell or battery, namely, the electrodes and electrolytes. There exists, however, another problem in the development of such a battery, namely, a battery which utilizes a molten salt as the electrolyte is subject to sustained high-temperature operation as well as to considerable variation in temperature. Specifically, the battery temperature may range from ambient up to its operating temperature which normally is in excess of 200° C, generally from about 350° to 450° C. The individual components of the battery have greatly different thermal coefficients of expansion. Obviously, some means must be provided in the battery for maintaining the individual components in a substantially fixed relationship with one another at these elevated temperatures and over the given temperature range.

It has been proposed that the components be fixed in a certain spatial relationship by utilizing a non-resilient means such as ceramic spacer members and pins to key the components together. However, such a technique does not allow for any movement of the components upon heating of the battery to its operating temperature. With a fixed restraining means, breakage of the individual components as a result of thermal expansion is not uncommon. Obviously, there still is a need for an electrical energy storage device wherein the individual components are retained in a desired relationship to one another, but which will still provide for some movement of the components as a result of thermal expansion.

Furthermore, in order to retain the active material in the positive electrode assembly, a porous separator is used. A relatively bulky supporting and retaining structure is then needed to hold the separator in place. To the extent that the available space in the cell structure is not utilized by active material, a lower energy density results. Thus in order to obtain a high-energy-density battery composed of a plurality of cells, which will be of practical interest for automotive applications and the like, the need exists for providing cell modules having maximum utilization of the cell volume, while at the same time providing ready access to cell components, ease of assembly, and reliability over sustained periods of operation. The devices heretofore proposed have been generally found lacking in several of these requirements.

SUMMARY OF THE INVENTION

It is an object of the present invention to provide a compact modular electric energy storage device, comprised of one or more cell modules, which overcomes the known disadvantages of prior art devices and more effectively utilizes the cell volume to provide a substantial improvement in energy density, while at the same time providing for improved ease of assembly and reliability of the cell module.

The present invention provides a more compact cell module by including a body of resilient carbonaceous material for retaining certain components of the device in a substantially fixed relationship with one another, such resilient means also permitting movement of the components resulting from thermal expansion. Broadly, the device comprises a housing containing ion-conductive electrolyte means disposed between negative and positive electrode structures and in contact therewith. The resilient carbonaceous body preferably comprises a partially compressed felt or cloth of carbon or graphite fibers so positioned in the device as to provide biasing means to maintain the cell components in substantially fixed position during cell operation. In certain embodiments, the ion-conductive electrolyte means also serves as separator means between the positive and negative electrode structures or assemblies, and may also include spacer means for maintaining desired separation between cell components. In other embodiments of the invention, particularly where the ion-conductive electrolyte means comprises a molten salt electrolyte, the separator means constitutes a separate member disposed between the electrode assemblies or forms part of either electrode assembly, serving also to retain particulate electrode material within the electrode assembly.

In a preferred embodiment of the invention, the device comprises a housing, an electrolyte contained within the housing, and negative and positive electrodes in contact with the electrolyte. The positive electrode comprises a body of active material confined in a material-holding assembly which includes at least one electrolyte-pervious separator member having first and second substantially parallel planar surfaces, i.e., opposite faces. The first face of the separator member is in restraining contact with the body of active material, and the second face faces the negative electrode. The separator member preferably has a porosity of from about 10 to 90 percent and a median pore size of from 5 to 500 microns for retaining the active material in place while permitting the free passage of ions therethrough. The device further includes a spacer member abutting the second face of the separator member and a resilient inert body of a solid carbonaceous material, most suitably consisting of at least partially compressed porous cloths or felts of carbon or graphite fibrous materials having an apparent density of from about 3 to 50%, preferably 3 to 15%, when the body is free from compression. This resilient carbon body maintains the spacer member and separator member in contact with one another to retain said separator member in said material-holding assembly and maintains the positive electrode assembly in position in the cell.

It has been discovered that a body of resilient carbonaceous material, such as woven or non-woven fibers of carbon or graphite, having a low apparent density when said body is unrestrained is a particularly effective biasing means at temperatures in excess of 200° C. Such graphite and carbon fiber materials are commercially available and form the subject of U.S. Pat. No. 3,107,152. Thus, the use of such a resilient carbon body in the high temperature electrical energy storage device of the present invention uniquely provides a means for resiliently urging certain components of the device into contact with one another while accommodating variations in the thermal expansion of the components when the device is charged and discharged, and heated to its various operating temperatures, which temperatures may be within the range of from 200° to 500° C or higher. Thereby, the need for bulky cell construction elements, such as ceramic pins and the associated structure for retaining the separator in place, are eliminated, making feasible a cell arrangement providing for greater utilization of the cell volume by the active electrode components and, consequently, a resultant higher energy density (watt hours/volume; and watt hours/weight) for the cell.

The use of a resilient carbon body composed of at least partially compressed porous woven or non-woven carbon or graphite fibrous material is particularly advantageous in the practice of the present invention because of the many benefits obtained thereby. Thus, while metals such as Inconel-X, Hastelloy-X and other nickel and stainless steel alloys have been suggested fo high temperature use, and could be fabricated into spring-like members, these are considered as generally unsuitable with respect to the other requirements present for the cell module. Thus, the solid carbonaceous resilient body is particularly advantageous, compared with metallic springs or resilient ceramic materials, in retaining its physical properties under conditions of cell operation, not being subject to creep, corrosion, or fracture for long life operation at elevated temperatures, including temperature cycling, being readily available at low cost, and providing great ease of fabrication and assembly. Accordingly, the present resilient carbon member offers a practical and convenient solution for providing an improved high-temperature compact modular cell not heretofore known.

The resilient carbon body is essentially inert to the molten salt electrolyte at the elevated temperatures of cell operation. However, direct contact with active material of the negative electrode, such as a lithium anode, should be avoided because of corrosive interaction therebetween.

Thus when it is desired to locate the resilient carbon body adjacent the negative electrode, certain additional precautionary measures may be required. Specifically, the resilient carbon body must be protected from the elemental electronegative active material such as elemental lithium. The resilient carbon body may be in contact with the electrolyte and maintained at a more electropositive potential than the negative electrode whereby during charging the lithium is electrodeposited into the electrode structure and not the resilient carbon body. This is readily accomplished by providing electrical insulation around the carbon body such that it is maintained at a substantially neutral (0.0 volts with respect to either electrode) potential. Alternatively, the resilient carbon body may be maintained at the same potential as the negative electrode but confined within a flexible container to physically isolate it from the elemental negative electrode material and the electrolyte.

When the negative electrode is grounded to the case, which is advantageous in that it reduces the number of electrical feed-through connections which must be provided in the case, it is particularly important that the resilient carbon body be protected. In accordance with one such mode of operation, the resilient carbon body is surrounded by an electrical insulator which may be in a form of a plurality of insulating blocks formed from ceramic electronically nonconductive material, or it may be confined within a flexible bag made from a cloth formed of woven ceramic fibers.

In accordance with another mode of operation, the resilient carbon body is at the same potential as the negative electrode. However, in such mode it is confined within a sealed flexible container which is impervious to the active material of the negative electrode and also impervious to the electrolyte. An example of such a container is a flexible bag formed from thin metallic sheets which are sealed at the seams by welding. Advantageously, such a container is evacuated before sealing such that, at the elevated temperatures enountered during normal operation of the electrical energy storage device, there are insufficient gases to expand and cause undue forces to be exerted on the device components or cause the container to rupture. Alternatively, the container could be provided with an opening above the electrolyte level whereby any gases retained within the container would be vented into the gaseous space above the device components. These and numerous other equivalent techniques will be readily apparent to those versed in the art.

The ion-conductive electrolyte means used in the electrical energy storage device of the present invention provides means for the transfer of ions between positive and negative electrodes, i.e., constitutes an electrolyte; provides a fixed minimum space between the electrodes; and prevents the migration of elemental active material from one electrode to the other.

The ion-conductive electrolyte means may comprise a solid electrolyte which will perform all three required functions of ion-transfer, spacing, and migration prevention. Examples of suitable solid electrolytes for use in various electrochemical systems are disclosed in U.S. Pat. Nos. 3,404,035 and 3,404,036; these patents are incorporated herein by reference. The solid electrolytes are described generally as consisting essentially of ions of aluminum and oxygen in crystal lattice combinations and cations of an alkali metal corresponding to the active material (alkali metal) of the anode. When solid electrolyte is used and located between the positive and negative electrodes, the resilient body of carbonaceous material may be disposed so as to maintain the electrodes and electrolyte in contact with one another.

Alternatively, the ion-conductive electrolyte means may comprise an electronically non-conductive porous body wetted with a molten salt electrolyte. In this embodiment the molten salt provides the means for transfer of ions between the electrodes, the porous body maintaining a fixed minimum space between the electrodes and also preventing the active material of one electrode from reaching the other.

The porous body is selected from materials resistant to elevated temperature and which are not chemically attacked by the electrolyte or active materials of the electrodes such as lithium. In this embodiment the resilient body of carbonaceous material is positioned so as to maintain the electrodes and electrolyte-wetted body in contact with one another.

In the presently preferred embodiment of the device, the ion-conductive electrolyte means comprises a molten salt electrolyte, spacer members and separator members, the latter of which is included as a part of the positive electrode assembly.

In a preferred embodiment, the device comprises a lithium-containing negative electrode, a sulfur-containing positive electrode, and a lithium-ion-containing molten salt electrolyte, i.e., molten at the operating temperature of the cell or battery. In such a preferred embodiment, the lithium anode may be either a porous substrate impregnated with liquid lithium or a solid electrode comprising a lithium alloy. Examples of suitable lithium alloys include lithium-lead, lithium-tin, lithium-zinc, lithium-aluminum and combinations thereof. A particularly preferred negative electrode is one containing an alloy of lithium and silicon, as reported in the Application of San-Cheng Lai entitled "Lithium Electrode and an Electrical Energy Storage Device Containing the same", Ser. No. 605,691 filed on Aug. 18, 1975 now U.S. Pat. No. 3,969,139, which is a continuation of application Ser. No. 512,635 filed on Oct. 7, 1974 now abandoned and assigned to the Assignee of the present invention. Such an alloy has substantially improved electrical potential and energy storage capacity as compared with the prior art lithium alloys.

The active cathode material contained in the positive electrode assembly preferably is one providing sulfur ions. The active cathode material may be either elemental sulfur or a metal sulfide in particulate form. Examples of metal sulfides contemplated include the sulfides of copper, iron, tungsten, chromium, molybdenum, nickel, cobalt, and tantalum. The sulfides of iron and copper or combinations thereof are particularly preferred for use with a molten salt electrolyte.

The term "molten salt electrolyte" as used herein refers to a lithium halide-containing salt which is maintained at a temperature at or above its melting point during operation of the electrical energy storage device. The molten salt may be either a single lithium halide, a mixture of lithium halides, or a eutectic mixture of one or more lithium halides and other alkali metal or alkaline earth metal halides.

Typical examples of binary eutectic salts are lithium chloride-potassium chloride, lithium chloride-magnesium chloride, lithium chloride-boron chloride, lithium bromide-potassium bromide, lithium fluoride-rubidium fluoride, lithium iodide-potassium iodide and mixtures thereof. Two preferred binary salt eutectic mixtures are those of lithium chloride and potassium chloride (melting point 351° C), and lithium bromide and rubidium bromide (melting point 278° C).

Examples of ternary eutectics useful as the molten salt electrolyte include calcium chloride-lithium chloride-potassium chloride, lithium chloride-potassium chloride-sodium chloride, calcium chloride-lithium chloride-sodium chloride, and lithium bromide-sodium bromide-lithium chloride. Preferred ternary eutectic mixtures include those containing lithium-chloride, lithium fluoride and lithium iodide (melting point 341° C) and lithium chloride, lithium iodide and potassium iodide (melting point 260° C).

The suitable alkali or alkaline earth metal ion should have a deposition potential very close to or preferably exceeding the deposition potential of the lithium ion in the electrolyte. Lithium halide salts can be readily combined with halides of potassium, barium, and strontium. While halides of metals such as cesium, rubidium, calcium, or sodium may be used, these are generally less desirable for use since a substantial proportion of these metals may be codeposited with the lithium when the electrode is charged, with some resulting small loss in potential.

Although the ternary eutectic salt mixtures, particularly those containing the iodides, provide lower melting points, the binary eutectic mixture of lithium chloride-potassium chloride sometimes is preferred on the basis of its lower cost and availability, particularly for batteries to be used in large-scale applications such as electric-powered vehicles and electric utility bulk energy storage.

In a preferred single module structural embodiment of the invention, two positive electrode assemblies are positioned at opposite ends of the cell housing and resting on the bottom cell member of the housing. A U-shaped spacer member is in abutting contact with the facing separator members of the positive electrode assemblies, with the negative electrode assembly being a unitary two-faced structure disposed between the positive electrode assemblies. A resilient body of partially compressed porous carbon or graphite fibrous material is packed within the housing, preferably at only one end, this resilient inert body urging the spacer member and the two separator members into contact with one another so as to maintain the positive electrode assemblies in a fixed position in the cell, yet flexibly movable with respect to changes in cell temperature. Conveniently, the negative electrode assembly is suspended from the top cover of the housing.

DESCRIPTION OF THE PREFERRED EMBODIMENTS

The present invention provides an electrical energy storage device which includes resilient means for maintaining certain components of the device in a substantially fixed desired relationship with one another. The design, construction, and features of the electrical energy storage device of the present invention will be more fully understood by reference to the attached drawings which depict certain exemplary embodiments of the invention.

Figure 1:
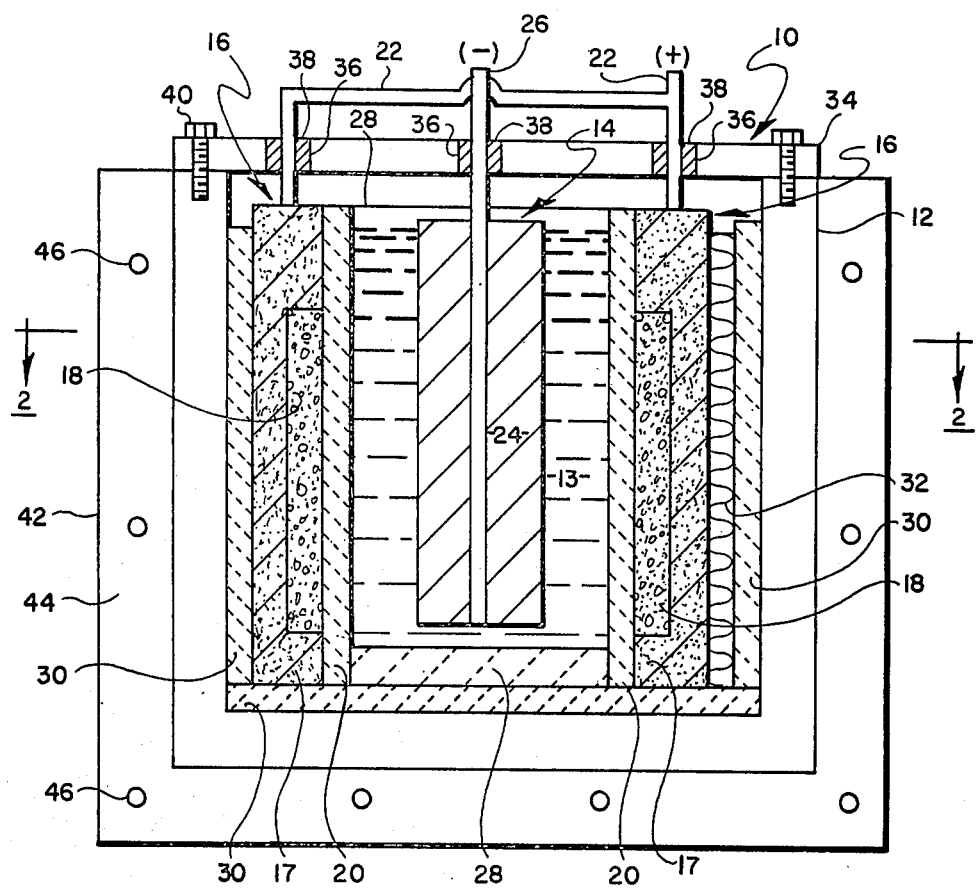
FIG. 1 is a sectional view in elevation of a compact modular cell built in accordance with the present invention.
Figure 2:
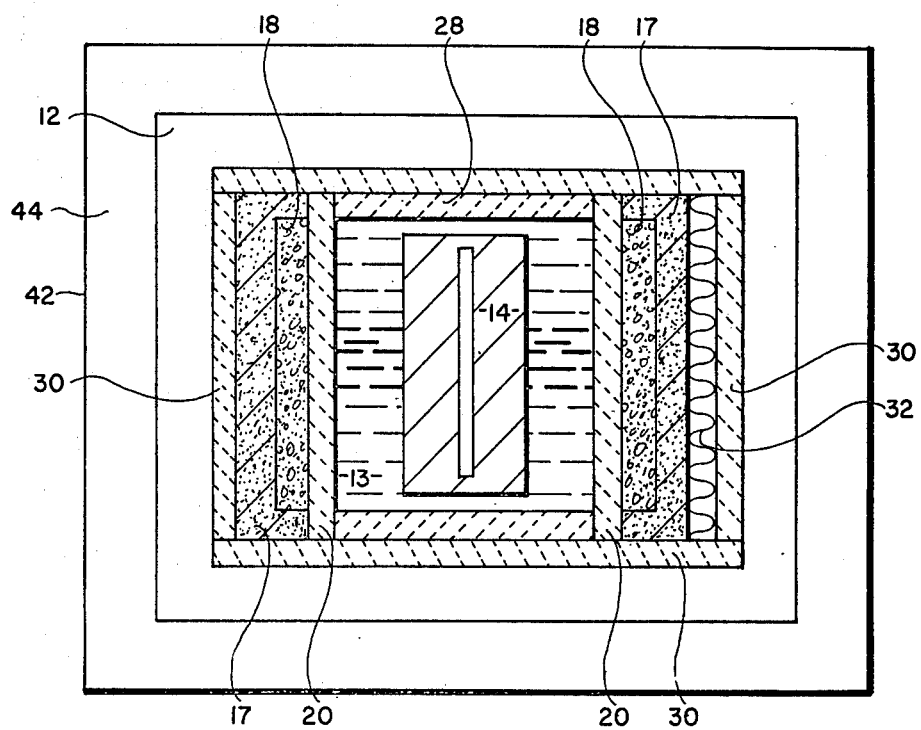
FIG. 2 is a sectional top plan view of the modular cell taken along the lines 2—2 of FIG. 1.

Referring now to FIGS. 1 and 2 of the drawings, thereon is shown a preferred modular single cell form of the electrical energy storage device of the present invention. The cell depicted therein is particularly adaptable for use in a battery containing a plurality of similar such cells, each of which are electrically connected in series to provide a higher desired battery potential, in parallel to provide a desired ampere-hour capacity, and combinations thereof. The cell 10 comprises a housing 12 which contains an electrolyte 13, a negative electrode assembly 14, and a positive electrode assembly 16. Each of the electrode assemblies are substantially immersed in the electrolyte.

The positive electrode assembly 16 includes a material-holding member 17 which defines a cavity for receiving a body of particulate active cathode material 18. In this particular embodiment the material-holding member 17 is a body of dense graphite. The active material 18 is retained in place by a porous separator plate 20. Separator is a body of dense graphite. The active material 18 is retained in place by a porous separator plate 20. Separator plate 20 is suitably and preferably formed from an electronically non-conductive material such as, for example, a ceramic. Examples of suitable ceramic materials include the oxides of aluminum, zirconium, tantalum, titanium, beryllium, boron, and combinations thereof. Advantageously, the selected ceramic should have a high degree of purity, i.e., be substantially free of any impurities. The selected separator material may have a porosity of from 10 to 90 percent, that is to say the material may have an apparent density of from 90 to 10 percent of that of the base material. A particularly preferred porosity range is from about 20 to 40 percent. The pore size should be sufficiently small to prevent the escape of the particulate active material 18, while still permitting the free passage therethrough of electrolyte ions. The separator member should therefore have a median pore size within the range of from 5 to 500 microns, and preferably from 20 to 100 microns for use with the preferred molten salt lithium battery. The two positive electrode assemblies 16 each are provided with electrical conductor leads 22 which are in electrical communication with one another.

The negative electrode assembly 14 comprises a body 24 of a lithium material and is provided with an electrical conductor lead 26. The body 24 of lithium material may be either a lithium alloy, as hereinbefore described, or a porous substrate impregnated with lithium, or lithium alloyed with another material to enhance the wetting of the substrate.

Intermediate the two positive electrode assemblies 16 and abutting porous separators 20 is a spacer member 28. The spacer member depicted in the drawing is shown as a unitary U-shaped member. Obviously, however, the spacer member could comprise a plurality of adjoining discrete parts, for example, two vertical side portions and a bottom portion. The material for the spacer member preferably also is a ceramic. Examples of particularly preferred ceramic materials are lithium aluminate, yttrium oxide, boron nitride, silicon nitride and beryllium oxide.

Also supplied in the housing 12 is a resilient carbon body 32, preferably of woven partially compressed graphite fibers, for resiliently urging said spacer member and separator members into contact with one another so that the active material 18 is retained in the material-holding member. The body of woven graphite fibers has an apparent density, when said body is unrestrained of from 3 to 50% and preferably from 3 to 15%. The term "partially compressed" means that said body in its unrestrained state occupies a volume in excess of that which is provided when present in the electrical energy storage device. The woven graphite fibers preferably have a diameter within a range of from about 10 to 150 microns, and particularly from 20 to 75 microns. Advantageously, the body of porous woven graphite fibers is compressed to from 25 to 50 percent and preferably from 30 to 40 percent of its unrestrained volume when it is placed in the electrical energy storage device. It will be appreciated that the exact amount of compression will vary depending upon, among other things, (a) the amount of force that it is desired to exert against the components, (b) upon the apparent density of the selected material, and (c) the number of such bodies of woven or nonwoven carbon and graphite fibers used. The terms "carbon" and "graphite" as used herein are essentially interchangeable for the purposes of the present invention, and refer to cloths, felts, yarns, and tapes, both woven and nonwoven, although a resilient body of porous woven fibers of graphite is generally preferred for its superior physical properties.

In the preferred embodiment depicted in FIGS. 1 and 2, the active components of electrical energy device 10 (active lithium body, active cathode material, and electrolyte) are electronically isolated from housing 12 by a plurality of insulator members 30.

Advantageously, the active components of the cell also are isolated from the atmosphere, for example, by a cover member 34, which encloses and is in sealing engagement with housing 12. Cover member 34 is retained by fastening means such as a plurality of threaded fasteners 40. The cover member also includes a plurality of apertures 36, each of which are provided with seals 38 through which extend electrical conductor leads 22 and 26. In FIG. 1 the two conductor leads 22 of the positive electrode assembly are shown connected together external to the cover. It generally is preferred, however, that the interconnection of the electrode assemblies be internal to reduce the number of openings required in the cover member, particularly when a number of cells are interconnected to form a battery having a desired voltage and ampere-hour capacity.

In a preferred embodiment of the device, the electrolyte is a salt which is molten at the operating temperature of the battery. For such embodiments, some means must be provided to heat the device to its operating temperature. Heat may be provided by an external source such as by placing the device in a furnace or other enclosure. In the embodiment depicted in FIGS. 1 and 2 the heating means comprises an outer liner 42 containing a body of thermal insulating material 44, and a plurality of heating elements 46, for example, electrical resistance heaters.

Figure 3:
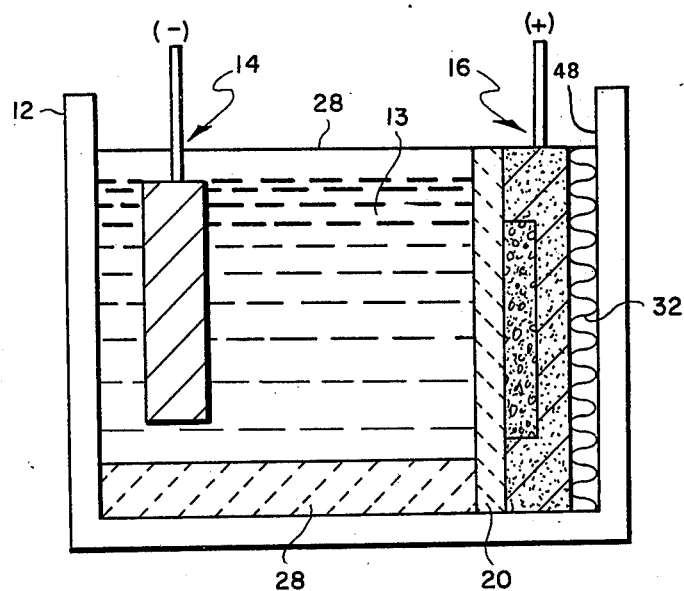
FIG. 3 is a sectional view in elevation of a simplified embodiment of the modular cell.

Referring now to FIG. 3, a simplified embodiment is depicted of an electrical energy storage device in accordance with the invention. The device comprises a housing 12, an electrolyte 13, a negative electrode assembly 14 and a single positive electrode assembly 16. The device further includes a spacer member 28 abutting housing 12 and porous separator member 20 of positive electrode assembly 16. A body 32 of at least partially compressed woven graphite fibers is located between positive electrode assembly 16 and the adjacent end wall 48 of housing 12 for resiliently urging positive electrode assembly 16, including separator member 20, into contact with spacer member 28, whereby the cell components are maintained in a substantially fixed desired relationship.

Figure 4:
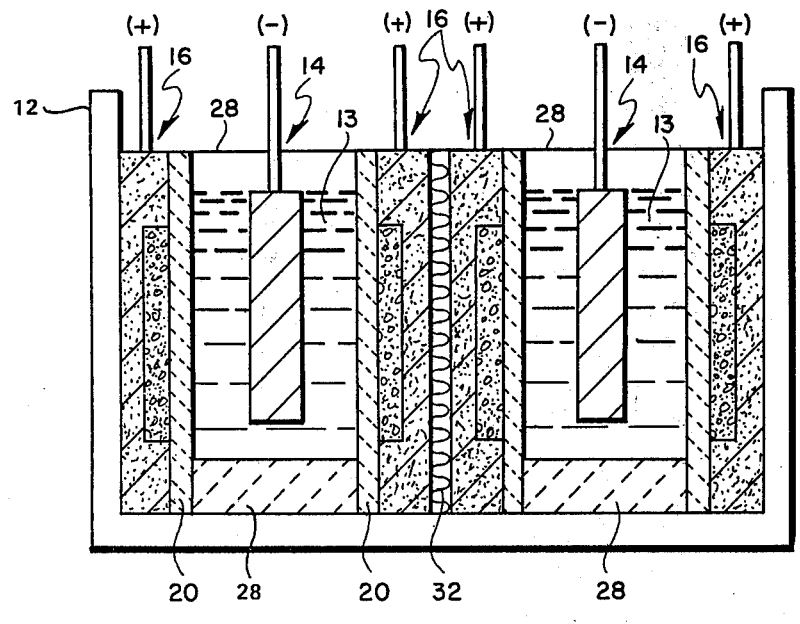
FIG. 4 is a sectional view in elevation of an embodiment of the invention wherein the battery device includes two modular cell units.

Referring now to FIG. 4, a two-cell electrical energy device is depicted utilizing the modular concept shown in FIGS. 1 and 2. The device depicted in FIG. 4 includes a housing 12 containing a plurality of two-faced negative electrode assemblies 14 and a plurality of positive electrode assemblies 16. The negative electrode assemblies 14 and positive electrode assemblies 16 are arranged such that each negative electrode assembly is located intermediate a pair of positive electrode assemblies. Each positive electrode assembly 16 has a porous separator member 20 in facing relationship with a negative electrode assembly, each face comprising active electrode material. Intermediate porous separator members 20 of each pair of positive electrode assemblies 16 is a spacer member 28. Located intermediate the two middle positive electrode assemblies 16 is a partially compressed body of woven graphite fibers 32 for resiliently urging the positive electrode assemblies, separator members, and spacer members into contact with one another thereby maintaining the assemblies and members in a substantially fixed desired relationship. It will be appreciated that the precise location of the body of partially compressed woven graphite fibers is not critical. For example, whereas it is shown in FIG. 4 as intermediate the two positive electrode assemblies, it will be obvious that resilient carbon body 32 could be placed at either or both ends of the electrical energy storage device.

Figure 5:
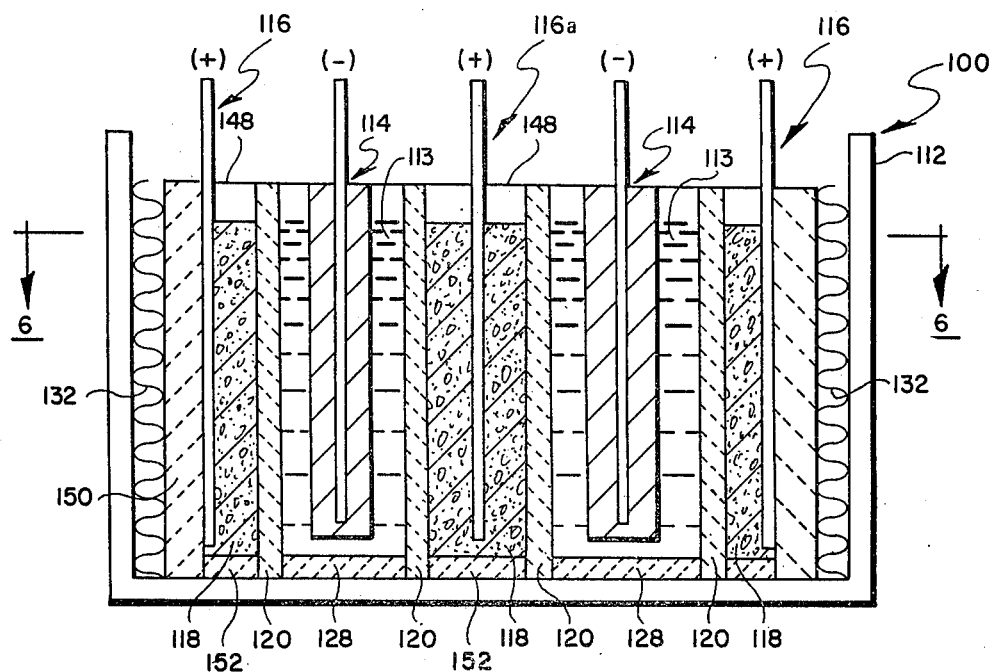
FIG. 5 is a sectional view in elevation of another embodiment of a two-cell device.
Figure 6:
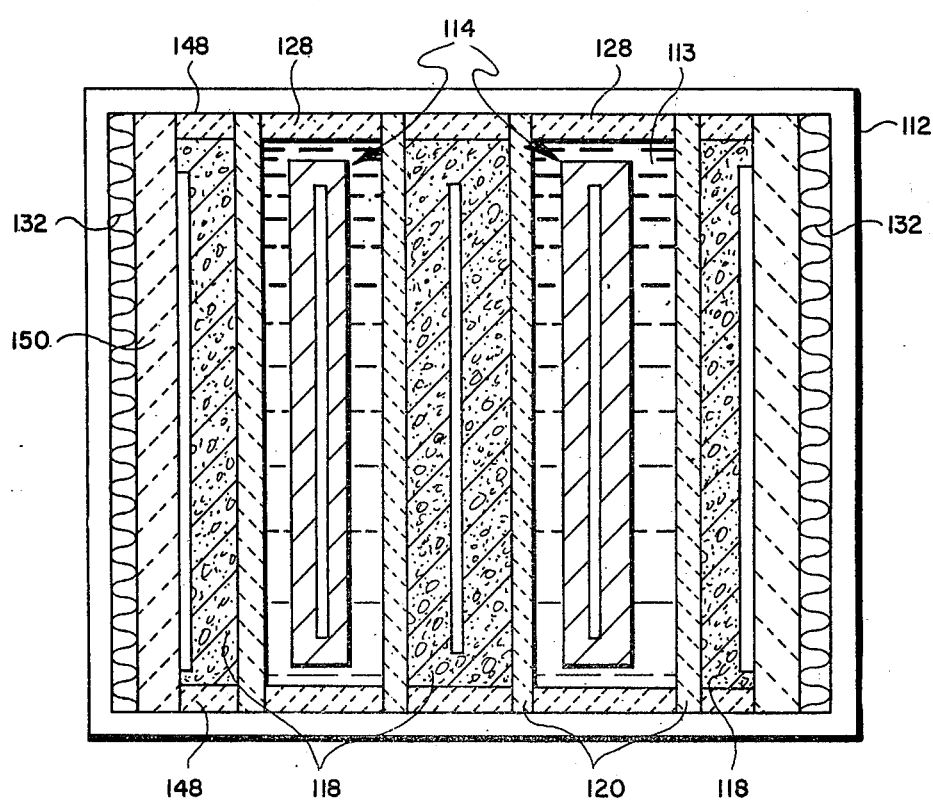
FIG. 6 is a sectional top plan view taken along the lines 6—6 of FIG. 5.

Referring now to FIGS. 5 and 6, therein is depicted yet another embodiment of the electrical energy storage device of the present invention. In this particular embodiment the positive electrode assemblies each comprise a plurality of electronically non-conductive elements which form a housing for confining the active material of the positive electrode assembly. Specifically, the apparatus 100 includes a housing 112 for containing an electrolyte 113. In contact with the electrolyte contained therein are a plurality of negative and positive electrode assemblies. The negative electrode assemblies 114 may be any of those hereinbefore described. The positive electrode assemblies include two end electrodes 116 and an intermediate electrode 116a. The end electrodes 116 each include a material-holding member for containing a body of active cathode material 118. Each of these material-holding members include a bottom member 152, side members 148, a back member 150, and a porous separator front member 120. Members 148, 150, 152, and 120 are preferably all formed from the electronically nonconductive ceramics described hereinbefore. Only the member in facing relationship to a negative electrode assembly or anode need be a porous ceramic separator member; the remaining members of electrodes 116 may be dense, substantially liquid-impervious materials to provide electrical insulation between housing 112 and the active elements of the device (active cathode material, anode, and electrolyte). Since intermediate electrode 116a is located between two negative electrode assemblies 114, its material-holding member comprises two porous separator members 120 forming the front and back walls, with two side members 148 and bottom member 152 located therebetween and defining a cavity for confining a body of active cathode material 118. Located between positive electrode assembly 116a and each end positive electrode assembly 116 is a spacer member 128. Intermediate either or both, as shown, of each end positive electrode assembly 116 and housing 112 is a partially compressed body of woven graphite fibers 132 for maintaining said members and assemblies in a predetermined substantially fixed relationship with one another during operation of the battery.

Figure 7:
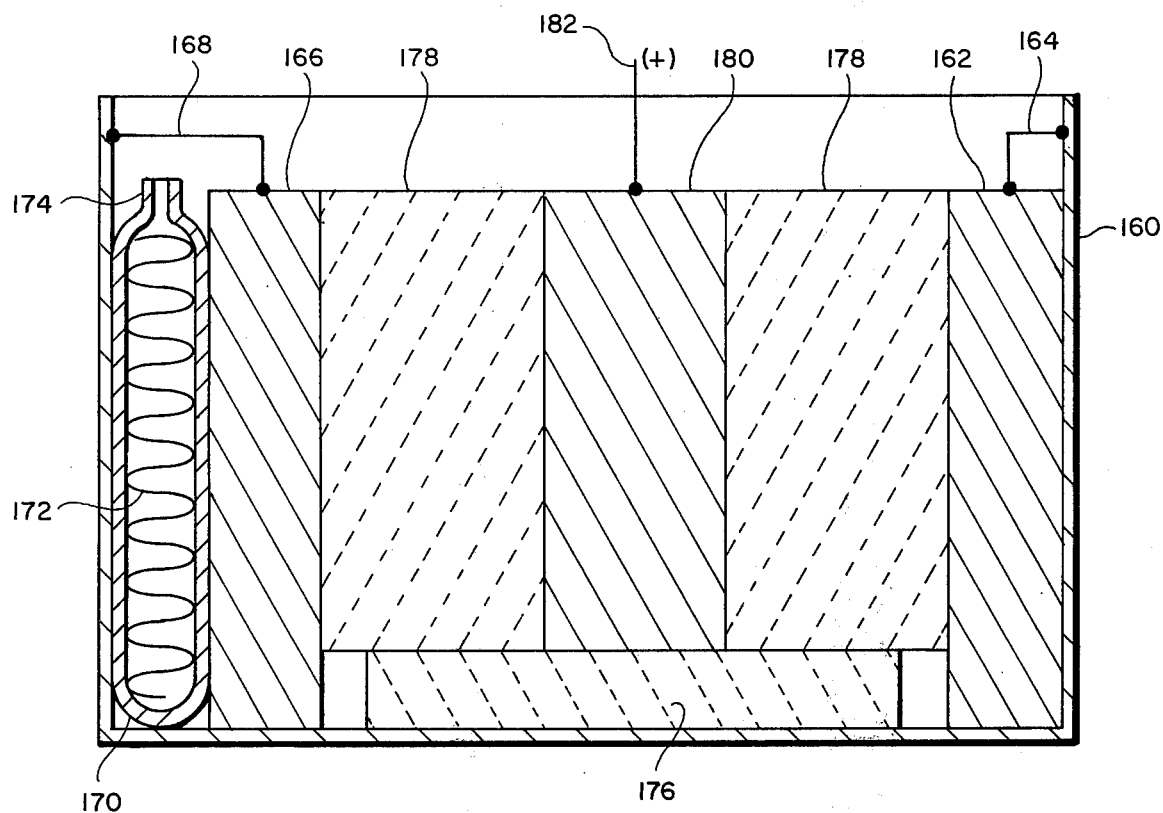
FIG. 7 is a sectional view in elevation of another embodiment of a compact modular cell built in accordance with the invention.

Referring to FIG. 7 therein is depicted yet another embodiment of the present invention. The apparatus includes a metal cell housing 160 containing a negative electrode assembly 162, which is in electrical communication with the housing. This may be accomplished by permitting the negative electrode assembly to physically contact the housing, actually connecting the negative electrode assembly to the housing such as by welding, or providing a current-conducting means 164 to maintain the electrode assembly and the cell housing 160 at the same potential. Another negative electrode assembly 166 is located adjacent the other end of housing 160 and is in electrical communication therewith via current-conducting means 168, which may be, for example, a conducting wire lead. Located intermediate negative electrode assembly 166 and housing 160 is flexible container 170 containing a resilient body of carbonaceous material 172 which acts as a spring means for resiliently urging certain cell components into contact with another.

In the embodiment depicted, the flexible container 170 is provided with a vent means 174 to permit the release of any gases contained therein when the cell temperature is increased. Located intermediate the two negative electrode assemblies is an insulator member 176 which may be a porous or non-porous electronically non-conductive material such as a ceramic. Also contained within the housing and abutting each negative electrode assembly are electrolyte-impregnated, electronically non-conductive, porous ceramic spacer members 178 which may be either rigid or flexible ceramics. Located intermediate the two spacer members is a positive electrode assembly 180, which is provided with a current-conducting means 182. An advantage of the embodiment depicted is that by permitting the negative electrode to be in electrical contact with the housing, substantially fewer insulator members are required than in the other embodiments. Thus, in the embodiment depicted the electrical energy storage device will have a higher electrical energy density per unit volume than in the other embodiments; also fewer parts are required.

The advantageous features of the electrical energy storage device of the present invention are thus readily apparent to those versed in the art. Specifically, since a resilient carbonaceous means now is available for maintaining a plurality of components in a substantially fixed relationship, it is possible to utilize components having substantially planar parallel surfaces, which components may be closely spaced together, thus obtaining a high utilization of the available volumetric space of any given device. Indeed, in accordance with the present invention, a 50% savings in space requirements is obtainable compared with the techniques heretofore utilized for high-temperature electrical energy storage devices such as lithium/molten salt/metal sulfide batteries. Accordingly, a substantial increase in the energy density of the cell is obtained.

The following non-limiting example is set forth as illustrative of the advantageous features provided by the device of the present invention.

EXAMPLE

An electrical energy storage device substantially the same as that depicted in FIGS. 1 and 2 was constructed. The electrical energy storage device included a housing 12 of stainless steel containing a molten salt electrolyte 13 consisting of a eutectic mixture of LiCl-KCl (m.p. 352° C), a negative electrode (anode) assembly 14, and two positive electrode (cathode) assemblies 16. The anode assembly 14 was a porous metal substrate impregnated with liquid lithium. Cathode assemblies 16 each included a dense graphite material-holding member 17 having a cavity for containing a body of active material 18 consisting of particulate iron sulfide. The cavity for containing the body of active material was covered with a flat porous separator member 20 having substantially parallel planar faces, a porosity of about 40% and a median pore size within the range of from 20 to 100 microns. One of the porous separator members 20 consisted of an oxide of aluminum, and the material used for the other porous separator member was an oxide of magnesium. Spacer member 28 located intermediate the two cathode assemblies 16 was U-shaped and formed from three pieces of a dense oxide of beryllium. Insulator members 30 were formed from a dense, impervious oxide of aluminum. Located between one cathode assembly 16 and insulator member 30 was an inert resilient body 32 consisting of a felt of partially compressed carbon fibers having an apparent density of about 4% when in an unrestrained or uncompressed state. The felt body of carbon fibers was compressed to about 50% of its free volume.

The electrical energy storage device was connected to a source of power and a load. The device was heated to its operating temperature (about 400° C) and then was cycled by alternately discharging and charging it at a predetermined constant current and for a preselected period of time. The device was operated for about 60 cycles over a period of 61 days at an average coulombic efficiency of 96%; during which period about 100% of the theoretical energy storage capacity was utilized indicating no loss of the active cathode material 18 from either cathode assembly 16. During operation the temperature varied from a low of 380° to a high of 450° C, thus clearly demonstrating the advantageous feature of the present invention for maintaining certain of the components in a desired substantially fixed relationship with one another at elevated temperatures over a varying temperature range. Upon disassembly, no evidence of cracks or breakage of any of the components as a result of excess stress was observed.

When the partially compressed woven carbon fibers 32 are removed and replaced with a high temperature alloy metallic biasing means, e.g., high temperature wrought stainless steels and Cr-Co-Mo alloys, as, for example, in the form of a metallic spring, or as a body of compressed metallic fibers, the biasing means gradually loses its resiliency when the device is maintained at its operating temperature, i.e., about 400° C. Such loss in resiliency results in separation of the components and loss of the active cathode material 18 to the molten salt electrolyte. Obviously, the loss of active material to the electrolyte also results in a substantial loss in battery capacity.

When it is attempted to maintain the various members of the electrical energy storage device in a desired relationship utilizing a fixed rigid means, such as either ceramic pins or a nonresilient wedge, generally occupying a substantially greater volume of the cell, various members of the electrical energy device are often found to crack or break upon heating of the device to its operating temperature. Thus, the electrical energy device of the present invention is clearly advantageous over these prior art techniques.

While the foregoing invention has been described with reference to certain preferred embodiments, and is particularly advantageous for use in a molten salt electrolyte cell operating at elevated temperatures, numerous variations will be apparent to those versed in the art. For example, in place of the molten salt electrolyte used in the modular cell, a solid state electrolyte or an organic electrolyte also can be utilized. Further, while the preferred active cathode materials have been illustrated and described as metal sulfides, it will be equally apparent to those versed in the art that the oxides and halides of various metals also could be utilized. In addition, while the resilient carbonaceous body described herein is particularly advantageous and effective when consisting of at least partially compressed carbon or graphite fibers, other more dense or solid resilient carbonaceous bodies may be used, less desirably, for certain specialized applications. However, such dense carbon bodies shaped in various conventional spring-like configurations are considerably bulkier and less stable structurally than the preferred fibrous forms. It should further be noted that the resilient carbonaceous bodies may be disposed at various other locations in the cell structure to provide the desired maintenance of cell components in relatively fixed position. It is not intended, therefore, that the invention be limited to the exemplary embodiments described and illustrated, but rather its scope is to be determined with reference to the objects thereof taken together with the following appended claims.

What is claimed is:
1. An electrical energy storage device comprising:
  a housing which contains device components including positive and negative electrode means positioned therein, ion-conductive molten salt electrolyte disposed between said positive and negative electrode means and in contact therewith, and a resilient carbonaceous body of at least partially compressed carbon or graphite fibers for resiliently urging at least selected device components in contact with one another and maintaining them in a substantially fixed position during operation of the device at elevated temperatures.

2. The device of claim 1 wherein said resilient carbonaceous body, when free from compression, has an apparent density of from about 3 to 50 percent.

3. The device of claim 1 wherein said resilient carbonaceous body is disposed between a wall of the housing and the negative electrode.

4. The device of claim 1 wherein said ion-conductive electrolyte comprises porous separator means containing electrolyte within its pores.

5. The device of claim 4 wherein a porous separator is maintained in contact with the positive electrode.

6. An electrical energy storage device comprising:
a. a housing having side and end walls and a bottom member forming a container;
b. a moltent salt electrolyte contained within said housing;
c. a negative electrode assembly in contact with said electrolyte;
d. a positive electrode assembly in contact with said electrolyte and spaced from said negative electrode assembly and comprising a body of active material retained within a material-holding member;
e. an electrolyte-permeable separator member having first and second opposing surfaces disposed between said negative and positive electrode assemblies, said first surface contacting said body of active material, said second surface facing said negative electrode assembly, said porous separator member retaining said active material in place while permitting the free passage of ions therethrough; and
f. a resilient body of at least partially compressed carbon or graphite fibers contained within said housing for resiliently urging said electrode assemblies and separator member into contact with one another to maintain at least said members in a substantially fixed position.

7. The device of claim 6 wherein said resilient carbonaceous body, when free from compression, has an apparent density of from about 3 to 50 percent.

* * * * *